United States Patent
Kwan

(10) Patent No.: US 8,186,596 B2
(45) Date of Patent: May 29, 2012

(54) APPARATUS, METHOD AND SYSTEM FOR SELECTIVE READING OF PIXELS FROM AN IMAGE CAPTURE DEVICE

(75) Inventor: Sik Piu Kwan, Suwanee, GA (US)

(73) Assignee: NCR Corporation, Duluth, GA (US)

( * ) Notice: Subject to any disclaimer, the term of this patent is extended or adjusted under 35 U.S.C. 154(b) by 472 days.

(21) Appl. No.: 12/335,878

(22) Filed: Dec. 16, 2008

(65) Prior Publication Data
US 2010/0147954 A1 Jun. 17, 2010

(51) Int. Cl.
G06K 7/10 (2006.01)
G06K 15/12 (2006.01)
(52) U.S. Cl. .......... 235/462.41; 235/462.11; 235/462.24
(58) Field of Classification Search ............. 235/462.41, 235/462.11, 462.24
See application file for complete search history.

(56) References Cited

U.S. PATENT DOCUMENTS

| 5,489,769 | A | * | 2/1996 | Kubo | 235/462.09 |
| 6,386,454 | B2 | * | 5/2002 | Hecht et al. | 235/462.16 |
| 2003/0098352 | A1 | * | 5/2003 | Schnee et al. | 235/472.01 |
| 2006/0119903 | A1 | * | 6/2006 | Chiba et al. | 358/474 |

OTHER PUBLICATIONS

Micron Technology, Inc., "MT9T001—1/2-Inch 3-Megapixel CMOS Digital Image Sensor" (Product Datasheet), 2004, 41 pages, USA.

* cited by examiner

*Primary Examiner* — Edwyn Labaze
(74) *Attorney, Agent, or Firm* — Paul W. Martin; Harden E. Stevens, III

(57) ABSTRACT

A device, methods and system for outputting selective rows of pixels from an image capture device. A command implemented by the image capture device of the form "Skip N, Out M" causes the image capture device to cycle through the all rows of pixels in the image capture device, outputting "M" sequential rows and skipping "N" sequential rows until all rows in the image capture device have been processed.

13 Claims, 5 Drawing Sheets

APPARATUS, METHOD AND SYSTEM FOR SELECTIVE READING OF PIXELS FROM AN IMAGE CAPTURE DEVICE

TECHNICAL FIELD

The invention described herein relates generally to improvements to semiconductor based image capture devices. More particularly, the invention relates to improving extraction of pixel data from image capture devices.

BACKGROUND

Bar code scanners are used in a wide variety of applications that rely on information stored in bar codes. Industries such as retail, airline, self-service, automotive, parcel delivery, pharmaceutical, healthcare and others use bar codes to provide inventory control, customer identification, item tracking, security and many other functions. A typical bar code is comprised of a number of bars separated by spaces. Information is encoded on a bar code by varying the width of the bars and spaces. When a bar code is placed within the field of view of a bar code scanner, the scanner will detect, analyze and decode the bars and spaces comprising the bar code to retrieve the information encoded wherein. This operation is also called scanning or reading a bar code. The information encoded on a bar code is usually a sequence of numeric or alphanumeric symbols (e.g., a Universal Product Code (UPC) or European Article Number (EAN)).

An imaging bar code scanner (also referred to as an image scanner) reads a bar code by capturing a digital image of the bar code and then processing the image to detect and decode the bar code. It is advantageous for the bar code scanner to successfully read all bar codes presented to the scanner on the first pass of each bar code by the scanner. This is known as a successful first pass read. Successful first pass reads of bar codes helps to maintain a good workflow at the checkout station and speeds up the overall checkout process. A high success rate for first pass reads has also been found to reduce stress on the person operating the scanner. This is particularly true if the operator is a customer operating a self-checkout terminal.

High performance passby barcode scanners based upon image capture and image processing technology have been slow to be adopted in passby scanning environments. In a retail environment, an image scanner must achieve an object passby speed of 30 to 50 inches per second. The image scanners on the market today have not proved capable of such speeds, which is one reason why laser based barcode scanners dominate the passby scanning environments.

One important barrier that has prevented image scanners from reaching high passby speeds is the amount of time required to extract sufficient pixel data from an image capture device to identify and decode an optical code contained in a captured image. Usually only a small portion of a captured image contains an optical code so only the pixel data for that portion is required to be extracted from the image capture device for decoding. Unfortunately, the optical code can appear anywhere within the captured image so more than just the pixel data representing the optical code has to be extracted from the image capture device and analyzed. Extracting all pixel data from an image capture device is very time consuming and extracting blocks of pixel data requires issuing commands to the image capture device for each block extracted which is also time consuming.

Therefore, it would be desirable to provide an image capture device that does not suffer from this problem.

BRIEF DESCRIPTION OF THE DRAWINGS

The invention, in accordance with preferred and exemplary embodiments, together with further objects and advantages thereof, is more particularly described in the following description taken in conjunction with the accompanying drawings in which like reference characters designate the same or similar parts throughout the several views and wherein.

DETAILED DESCRIPTION

In the following description, numerous details are set forth to provide an understanding of the claimed invention. However, it will be understood by those skilled in the art that the claimed invention may be practiced without these details and that numerous variations or modifications from the described embodiments are possible.

Figure 1:
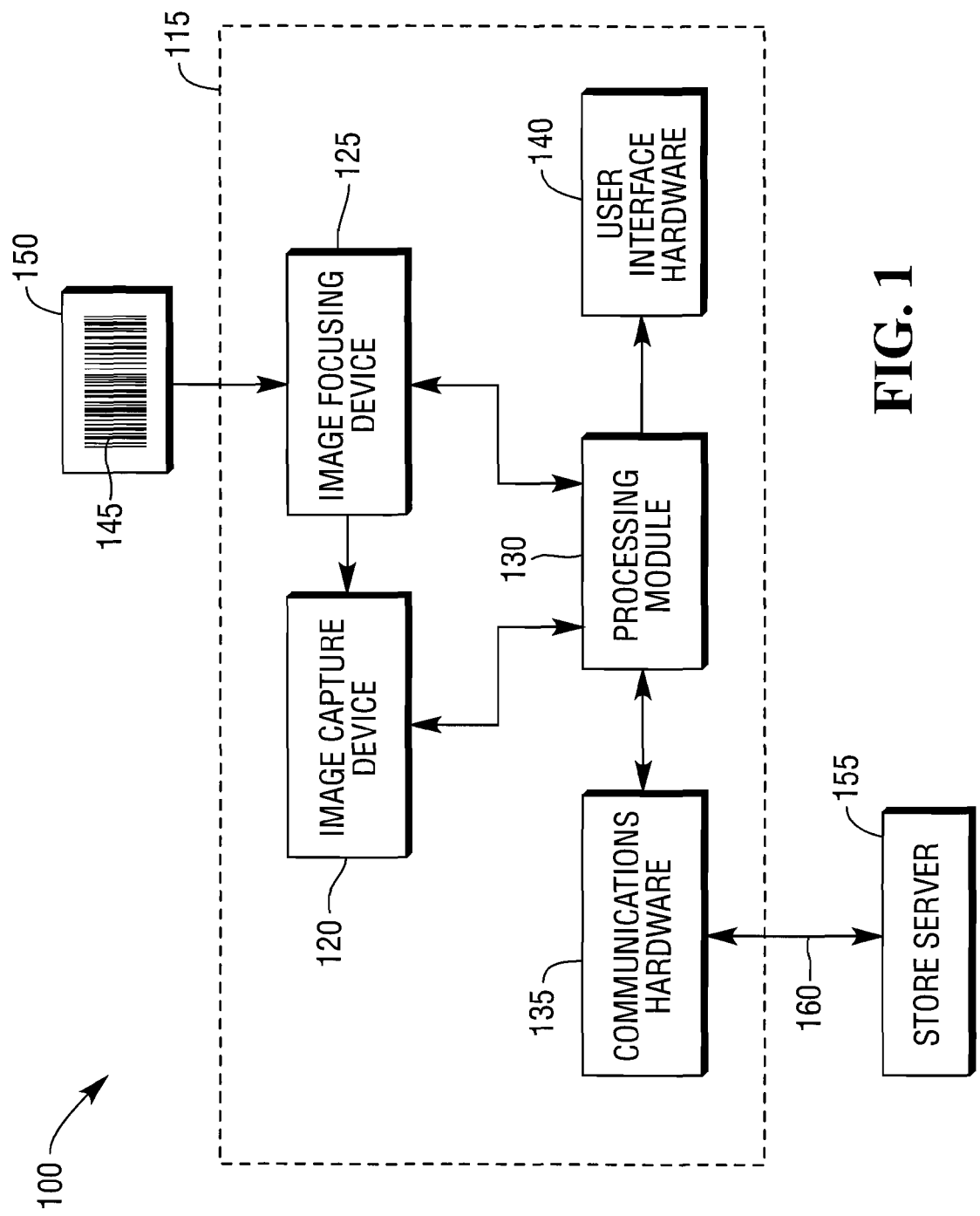
FIG. 1 is a high level block diagram illustrative of an embodiment of an image scanning system.

With reference to FIG. 1, there is provided a high level illustration, in block form, of an embodiment of an image scanning system 100, which is used to scan a bar code 145. The image scanning system 100 comprises an image scanner 115, a store server 155 and a bar code 145 printed on a label 150. The image scanner 115 communicates with the store server 155 over a computer data network 160. The network 160 can be a wired network (e.g., an Ethernet network) or wireless network (e.g., an IEEE 802.11G based network) or a combination of both. In some embodiments, the store server 155 is physically removed from the store where the image scanner 115 is located and communicates with the image scanner 115 over the Internet or a wide area network or a combination of these or different types of networks. In some embodiments, multiple image scanners 115 communicate over the data network 160 to the store server 155.

The image scanner 115 includes an image-focusing device 125 that receives an image and focuses the image onto an image capture device 120. The image scanner 115 is further comprised of a processing module 130, user interface hardware 140, and communications hardware 135. The processing module 130 comprises at least one processor, memory, stored instructions and control and interface hardware to control the other devices and modules of the image scanner 115. The processing module 130, by executing the stored instructions, controls the hardware devices and modules that comprise the image scanner 115 or are connected to the image scanner 115. In addition, the stored instructions cause the processor to: process data such as an image that is captured by the image capture device 120, control the communications hardware 135 to implement protocols used on the data network 160 and implement other software features and functions of the image scanner 115. In some embodiments, the store server 155 sends the image scanner 115 updates to the stored instructions or to the operating parameters of the image scanner 115. These updated stored instructions are stored in the image scanner 115 and then executed as required.

Image capture device 120 converts light reflected from bar code 145 into electrical signals. The source of the reflected light may be ambient light or light from an illumination device if sufficient ambient light is unavailable. The image capture device 120 is a silicon-based device with both optical and integrated circuits and may be fabricated as a complimentary metal oxide semiconductor (CMOS) integrated circuit. Image capture device 120 may include a charge coupled device (CCD) or a CMOS device.

Image capture device 120 captures an optical image, focused on its surface, by converting the optical image to an electronic digital image comprising pixel information organized into rows and columns. The time required to read all of the raw pixel data from the image capture device 120 is relatively long compared to the time required to simply capture the digital image in the image capture device 120.

Figure 2:
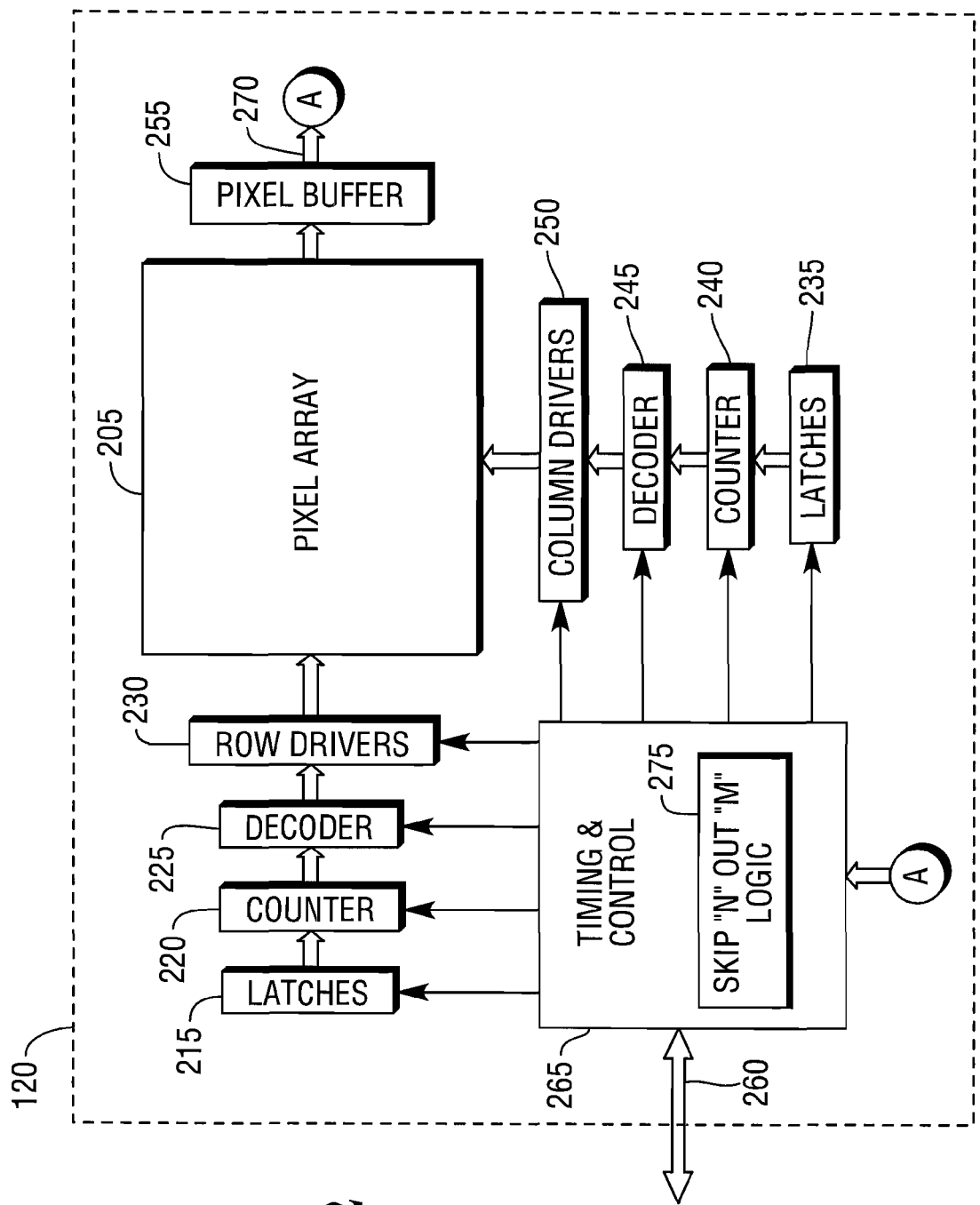
FIG. 2 is a high level block diagram illustrative of an embodiment of an image capture device.

Turning to FIG. 2, there is provided a high level block diagram of an image capture device 120. In this embodiment, the image capture device 120 is implemented as a CMOS device. The pixel array 205 defines the optically active area of the image capture device 120 and is where light or photon energy is converted into electric energy and stored as individual pixel data. An individual pixel contains data wherein the magnitude of the data is proportional to the total amount of photon energy striking a given area of the pixel array 205 integrated over a period of time. The pixels are physically organized into rows and columns. Timing and control logic 265 controls the operations of the image capture device 120 including capturing an image and reading pixel data from the pixel array 205 that represent the captured image. External interface 260 provides access to and control of the timing and control logic 265 to external devices (i.e., a processor 130 or specialized hardware designed or programmed to process data from the image capture device 120). The external interface 260 is also used to receive commands from the external device and to send and receive data, including pixel data. Pixel data, captured by the image capture device 120, is transferred from the pixel array 205 to a pixel buffer 255 and then transferred externally through the external interface 260 when an external device signals it is ready to except the data. The timing and control logic 265 controls the operation of the pixel buffer and movement of pixel data through an internal interface 270. The external interface 260 interfaces with a data/control bus (not shown) that is external to the image capture device 120. The timing and control logic 265 manages the interaction with the data/control bus and the external device or devices. In addition, the timing and control logic 265 receives commands and parameters used to control the operation of the image capture device 120. Some commands are low-level bus commands that control the operation of a bus. Other high-level commands control the operations of the image capture device.

An example of a high-level command is a command to "read-out all pixel data" from the image capture device 120. This is an atomic command and causes the timing and control logic 265 to read all pixel data from the pixel array 205 and deliver the data to an external device in one continuous operation. The timing and control logic 265 starts the process by loading the row latches 215 with the first row number of the pixel array 205 and the column latches 235 with the first column number of the pixel array 205. The row latches 215 drive a row counter 220 which increments the row number on command from the timing and control logic 265 to allow each row of the pixel array to be selected in its turn or as needed.

The output of the row counter 220 drives a row decoder 225, which generates a select row signal corresponding to a single row in the pixel array 205. The output of the row decoder 225 connects to the row drivers 230, which buffers and transmits a row select signal to the pixel array 205 to select a single row of pixel data. The column latches 235 drive a column counter 240, which will increment the column number on command from the timing and control logic 265 to allow each column in a row to be selected in its turn or as needed. The output of the column counter 240 drives a column decoder 245, which generates a single column select signal corresponding to a single column in the pixel array 205. The output of the column decoder 245 connects to the column drivers 250, which buffers and transmits a column select signal to the pixel array 205. The row and column select signals combine to select a single pixel from the pixel array 205. The pixel data for the selected pixel is moved to the pixel buffer 255 where it is stored before being read by a processor module 130 or computer logic that is external to the image capture device 120. The timing and control logic 265 continues to read every pixel in the pixel array 205 and transfer the data to an external device.

External devices read pixel data from the image capture device 120 by issuing low-level bus commands to the external interface 260. The timing and control logic 265 then moves data from the pixel buffer 255 to the external interface 260 to satisfy the request for data. An individual low-level bus read command should not be equated to a high level atomic command to read multiple pixels from the image capture device 120. A low-level bus read command can only read data that is made available as a result of a high-level atomic command to read pixel data from the image capture device 120.

In some embodiments, the pixel buffer 255 buffers data from multiple pixels so that multiple pixels are read with a single external bus access to the image capture device 120. This reduces the bus time needed to read the pixel array 205 because fewer bus read cycles are required. In some embodiments, the pixel buffer 255 conditions or transforms the pixel data from an analog form to a digital form.

The timing and control logic 265 also supports a "Skip N, Out M" command 275. This is an atomic command that selects and reads a repeating pattern of pixel rows from the pixel array 205. The repeating pattern is created by selecting "M" rows of pixels then skipping "N" rows of pixels and repeating the process until all rows of the pixel array 205 have been processed. The pixel data from the selected rows is read and transferred external to the image capture device 120.

Figure 3:
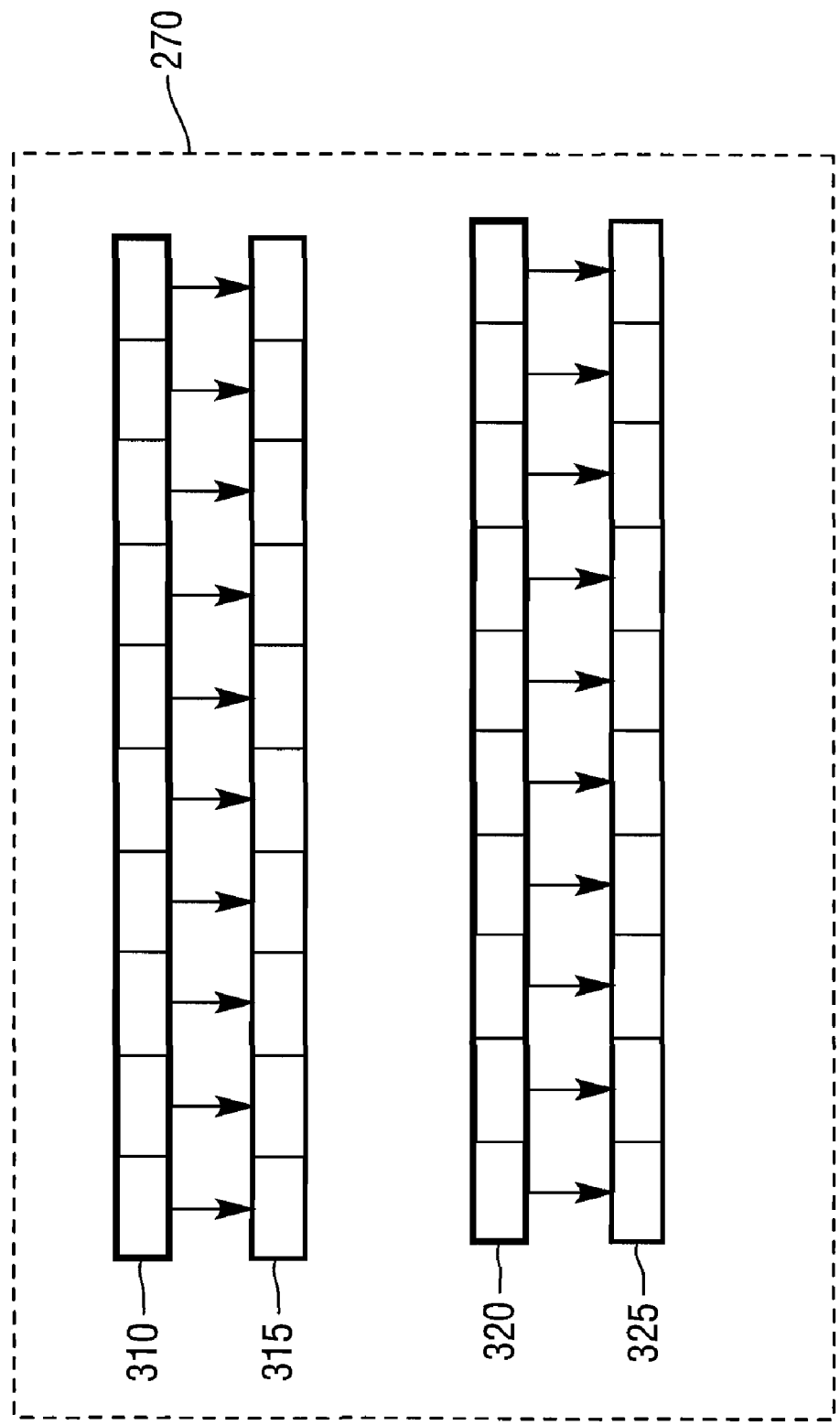
FIG. 3 is a high level architectural diagram showing a portion of the logic used to implement the Skip "N", Out "M" command.

FIG. 3 is a high level architectural diagram showing a portion of the logic used to implement the Skip "N", Out "M" command. The diagram depicts two registers and two counters. The two registers are used to store parameters contained in the command. The number of rows that are skipped in each cycle is called "N" and the value is stored in the "Skip N" register 310. The number of rows that are read in each cycle is called "M" and the value is stored in the "Out M" register 320. When the timing and control logic 265 receives a Skip "N", Out "M" command, the values for "N" and "M," contained in the command, are stored in the proper register. Reading of "M" rows and skipping of "N" rows is a single skip/out cycle. Skip/out cycles are repeated starting with the first row of pixel array 205 and continuing until the last row of the pixel array 205 is reached. At the beginning of each skip/out cycle, the value for "N" is moved from the "Skip N" register 310 to the "N" counter 315 where the value is decremented to determine how many rows to skip. Likewise, the value for "M" is moved from the "Out M" register 320 to "M" counter 325 where the value is decremented to determine how many rows to read. The timing and control logic 265 uses this logic along with the logic described in FIG. 2 to implement the command. A more detailed description is provided in FIG. 4.

Figure 4:
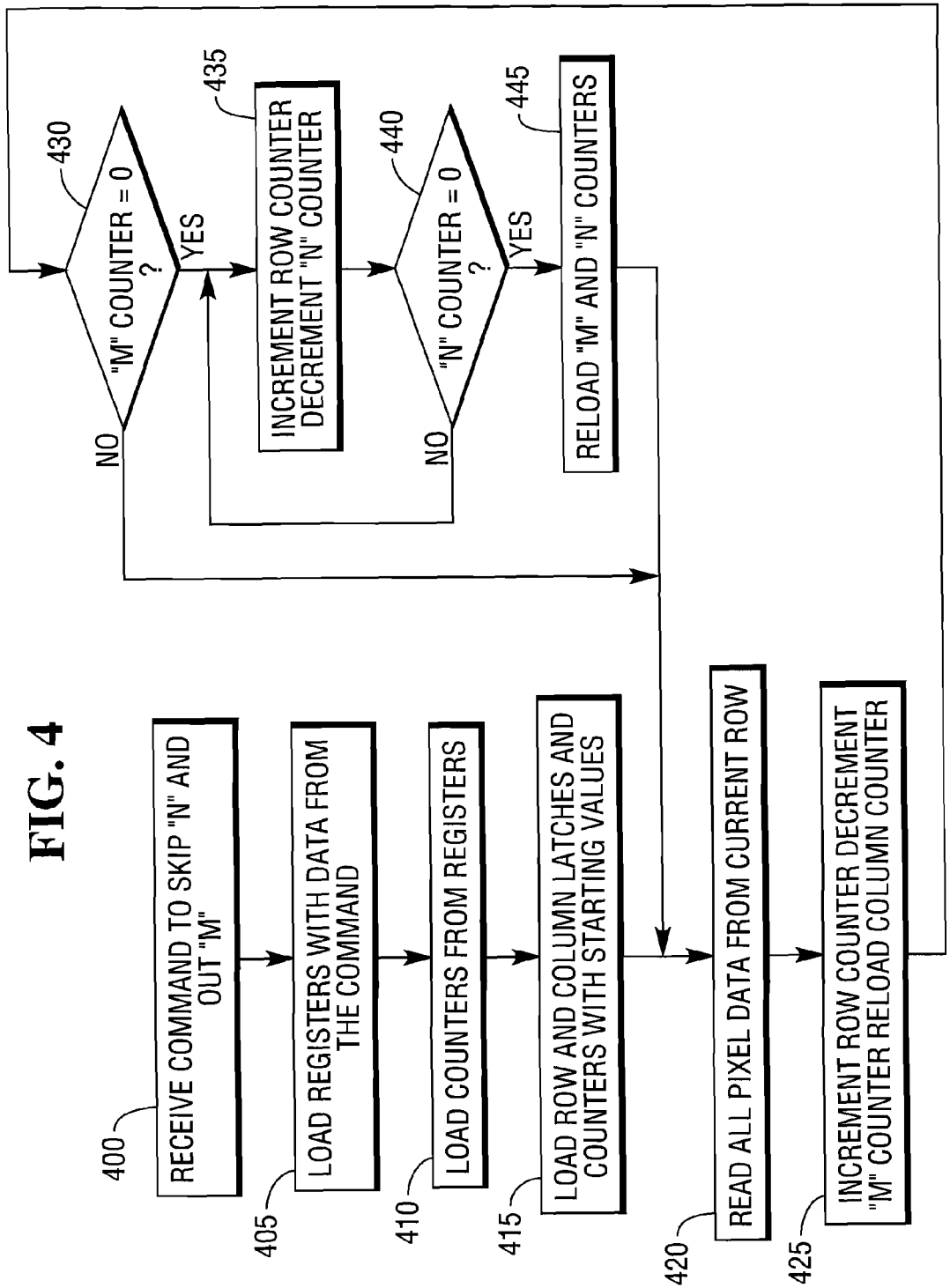
FIG. 4 is a high level flow diagram illustrating the steps used to execute a Skip "N", Out "M" command.

Turning to FIG. 4, there is provided a high level flow diagram illustrating the steps used by the image capture device 120 to execute a Skip "N", Out "M" command. Using the external interface 260, the timing and control logic 265 receives an atomic command to skip "N" and out "M" rows of the pixel array 205 (step 400). The timing and control logic 265 takes the "N" and "M" values from the command and stores the "N" value in the "Skip N" register 310 and stores the "M" value in the "Out M" register 320. In addition, the row and column latches 215, 235 are loaded with their respected pointer to the first row and first column in the pixel array 205 (step 405). The values in the row latches 215, column latches 235, Skip N register 310 and Out M register 320 are loaded into the row counter 220, the column counter 240, the "N" counter 315 and "M" counter 325 respectively (step 415). All pixels in the current row (the row pointed to by the row counter 220) are read in turn as the column counter 240 is incremented to point to every column in the row. The data is transferred to the pixel buffer 255 and then transferred out of the image capture device 120 (step 420). The row counter 220 is incremented by one, the "M" counter 325 is decremented by one and the column counter 240 is reloaded with the value in the column latches 235 (step 425). If the "M" counter has not reached zero, control is transferred to step 420 so that another row of pixels can be read from the pixel array 205. If the "M" counter has reached zero, control passes to step 435 (step 430). At this point the number of rows for this cycle have been read and it is time to skip one or more rows before the cycle starts over. The row counter 220 is incremented and the "N" counter 315 is decremented (step 435). If the "N" counter is not zero, control is transferred to step 435 to skip over at least one more row. If the "N" counter is zero, control passed to step 445 (step 440). At this point, "M" rows have been read and "N" rows have been skipped so the cycle starts over. The "N" and "M" counters 315, 325 are reloaded with the values in the "Skip N" register 310 and "Out M" register 320 respectively and control passes to step 420 to start the next cycle by reading the next row of pixels (step 445).

Figure 5:
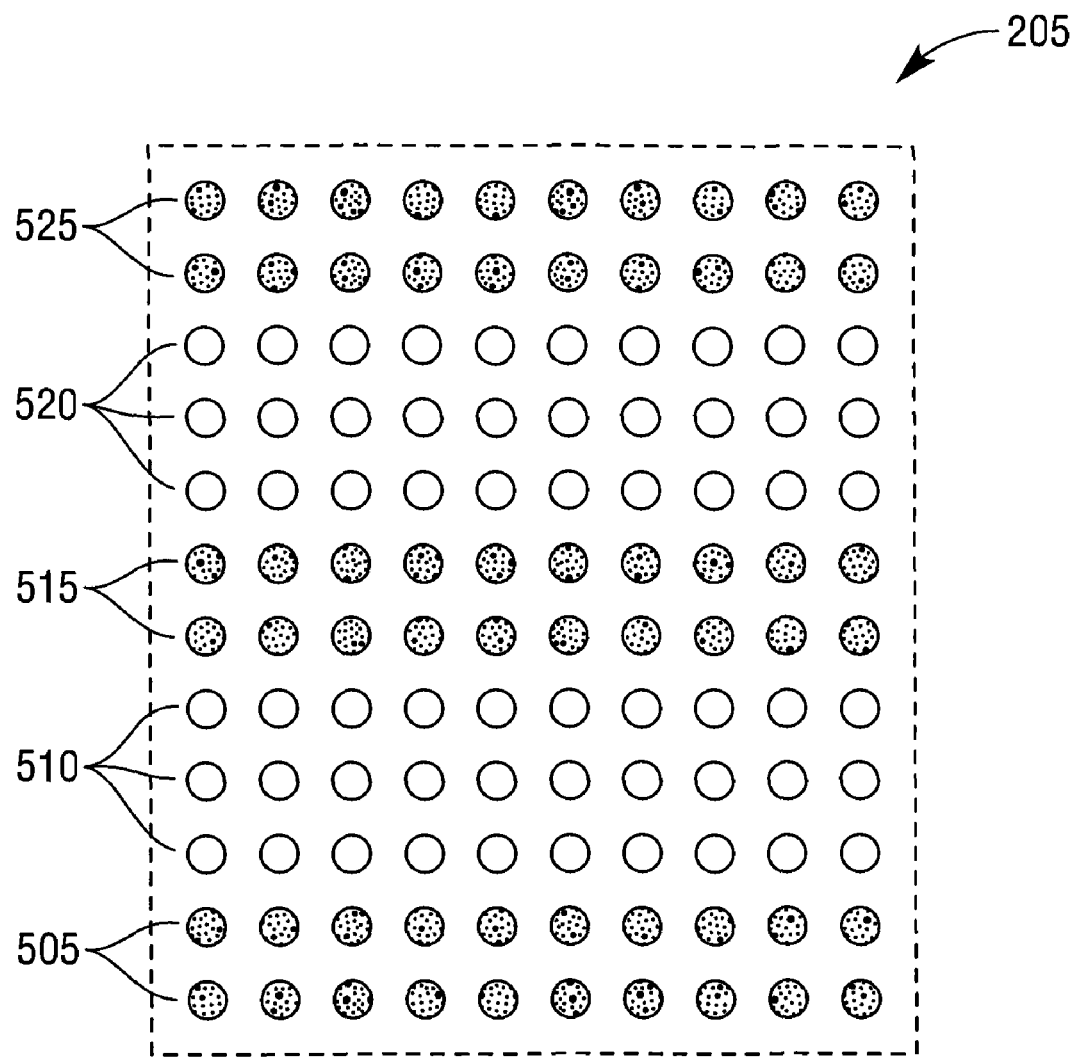
FIG. 5 is a diagram of a portion of the pixel array 205 and illustrates one example of the rows selected by a Skip "N", Out "M".

With reference to FIG. 5, there is provided a diagram of a portion of the pixel array 205. In this diagram the rows of shaded circles 505, 515, 525 represent the rows of pixels selected by a Skip "N", Out "M" command where "N" is set to 3 and "M" is set to 2. The rows with unshaded circles represent the rows of pixels that are skipped. In this example, two rows are selected and three rows are skipped. The cycle of selecting two rows and skipping three rows starts with the first row of the pixel array 205 is repeated until the last row of the pixel array 205 is reached.

The rows of pixel data that are outputted by a Skip "N", Out "M" command are processed by a computer or processing module 130 to locate and identify optical codes such as a bar code in a captured image. Reducing the number rows of pixels read from the image capture device 120 reduces the time required to read, locate and identify the optical codes in a captured image. Using a single command like the Skip "N", Out "M" command to read the reduced number of rows of pixels further reduces the time required to read, locate and identify optical codes in a captured image.

In some embodiments, the first row of pixels selected by a Skip "N", Out "M" command is the first row of pixels in the pixel array 205. In other embodiments, an offset can be included in the command that causes the first selected row of pixels to be a row other than the first row of pixels in the pixel array 205. In still other embodiments, receiving a Skip "N", Out "M" command causes the image capture device 120 to capture an image prior to selecting rows of pixels for outputting. Some embodiments have a continuous operation mode where the process of capturing an image and selecting and skipping rows of pixels for output from the captured image is repeated continuously.

While the invention is disclosed in the context of an image capture device used to read optical codes, it will be recognized that a wide variety of implementations may be employed by a person of ordinary skill in the art consistent with the above discussion and the claims, which follow below. In addition, the image capture device 120 can be used in other functions not associated with bar code recognition.

What is claimed is:

1. A method implemented by an image capture device for outputting selective rows of pixels from the image capture device, the method comprising:
   receiving a command to read selective rows of pixels from a pixel array in the image capture device where the command comprises a row skip value and a row out value;
   selecting a number of sequential rows of pixels equal to the row out value and reading pixel data for the selected rows from the pixel array and transferring the pixel data externally;
   skipping a number of sequential rows of pixels equal to the row skip value; and
   repeating the selecting and skipping step until the last row of the pixel array is reached.

2. The method of claim 1, wherein the first sequential row of pixels selected is the first row of pixels in the pixel array.

3. The method of claim 1, wherein the first sequential row of pixels selected is not the first row of pixels in the pixel array.

4. The method of claim 1, wherein receiving the command to read selective rows of pixels also causes as image to be captured.

5. The method of claim 1, wherein receiving the command to read selective rows of pixels causes multiple images to be captured where the selecting, skipping and repeating steps are repeated after each image is captured.

6. The method of claim 1, where the image capture device is a CMOS image sensor.

7. The method of claim 1, wherein the image capture device is a charged coupled device (CCD) image sensor.

8. An image capture device comprising:
   a pixel array organized into rows and columns of pixels;
   an external interface used to send and receive commands and data;
   timing and control logic that controls the operation of the image capture device using commands and data received through the external interface; and
   where the timing and control logic in response to receiving a skip "N" out "M" command skips "N" sequential rows of pixels and reads the next "M" sequential rows of pixels outputting the read pixel data, repeating the skipping and reading until the last row of the pixel array is reached.

9. The device of claim 8, where the image capture device is a CMOS image sensor.

10. The device of claim 8, wherein the image capture device is a charged coupled device (CCD) image sensor.

11. An optical code image scanning system comprising:
   optical code image scanner comprising
      a processing module; and
      an image capture device comprising:

a pixel array organized into rows and columns of pixels;

an external interface used to send and receive commands and data;

timing and control logic that controls the operation of the image capture device using commands and data received through the external interface; and where the timing and control logic in response to receiving a skip "N" out "M" command from the processing module, skips "N" sequential rows of pixels and reads the next "M" sequential rows of pixels outputting the read pixel data, repeating the skipping and reading until the last row of the pixel array is reached.

12. The system of claim 11, further comprising a point-of-sale computer in communication with the optical code image scanner.

13. The system of claim 11, further comprising a store computer connected to the point-of-sale computer over a network.

* * * * *